No. 823,440. PATENTED JUNE 12, 1906.
J. RICHARD.
REGISTERING DIFFERENTIAL SPEED INDICATOR.
APPLICATION FILED NOV. 2, 1903.
4 SHEETS—SHEET 4.
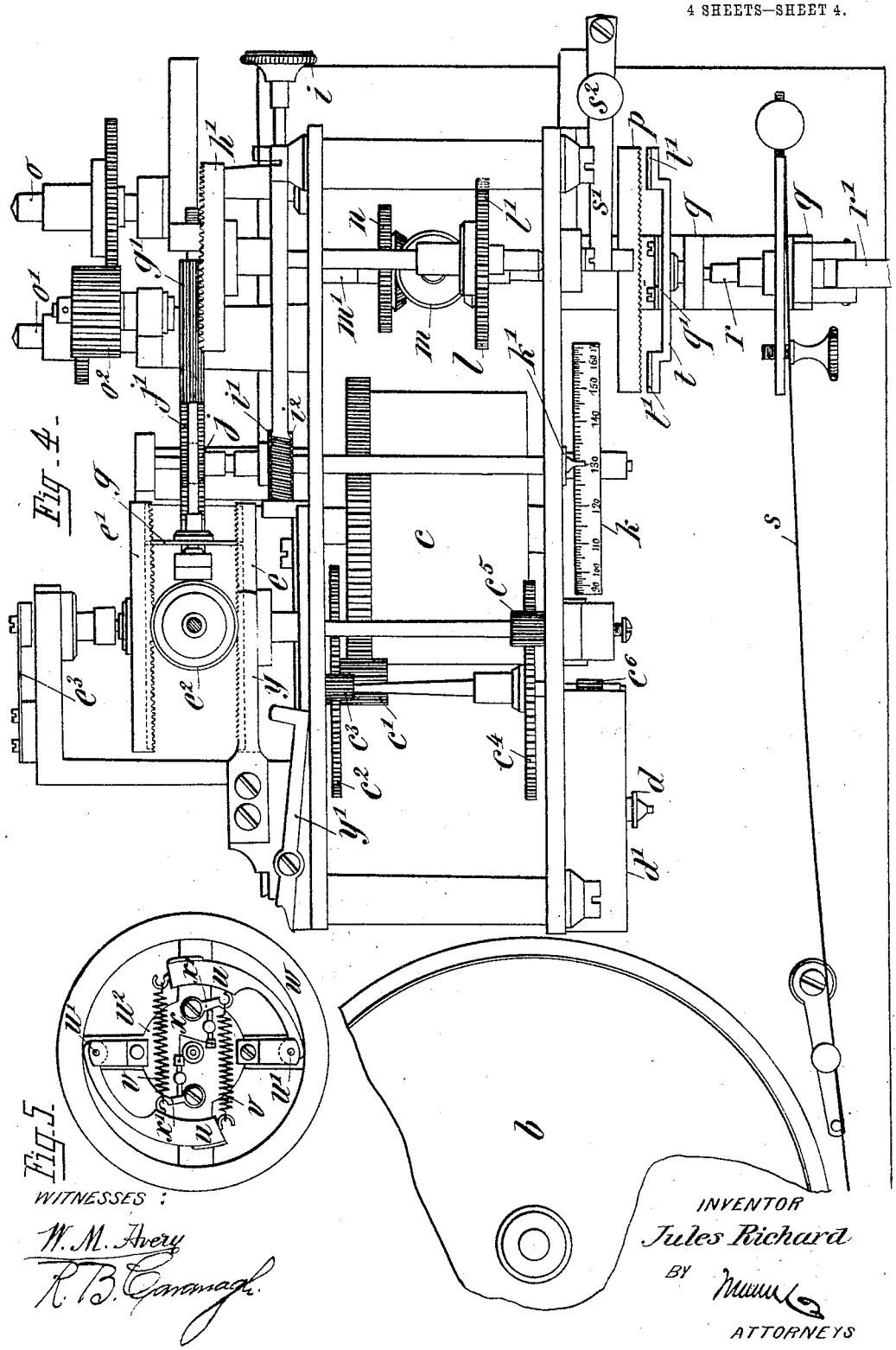
WITNESSES:
W. M. Avery
R. B. Cavanagh
INVENTOR
Jules Richard
BY
ATTORNEYS

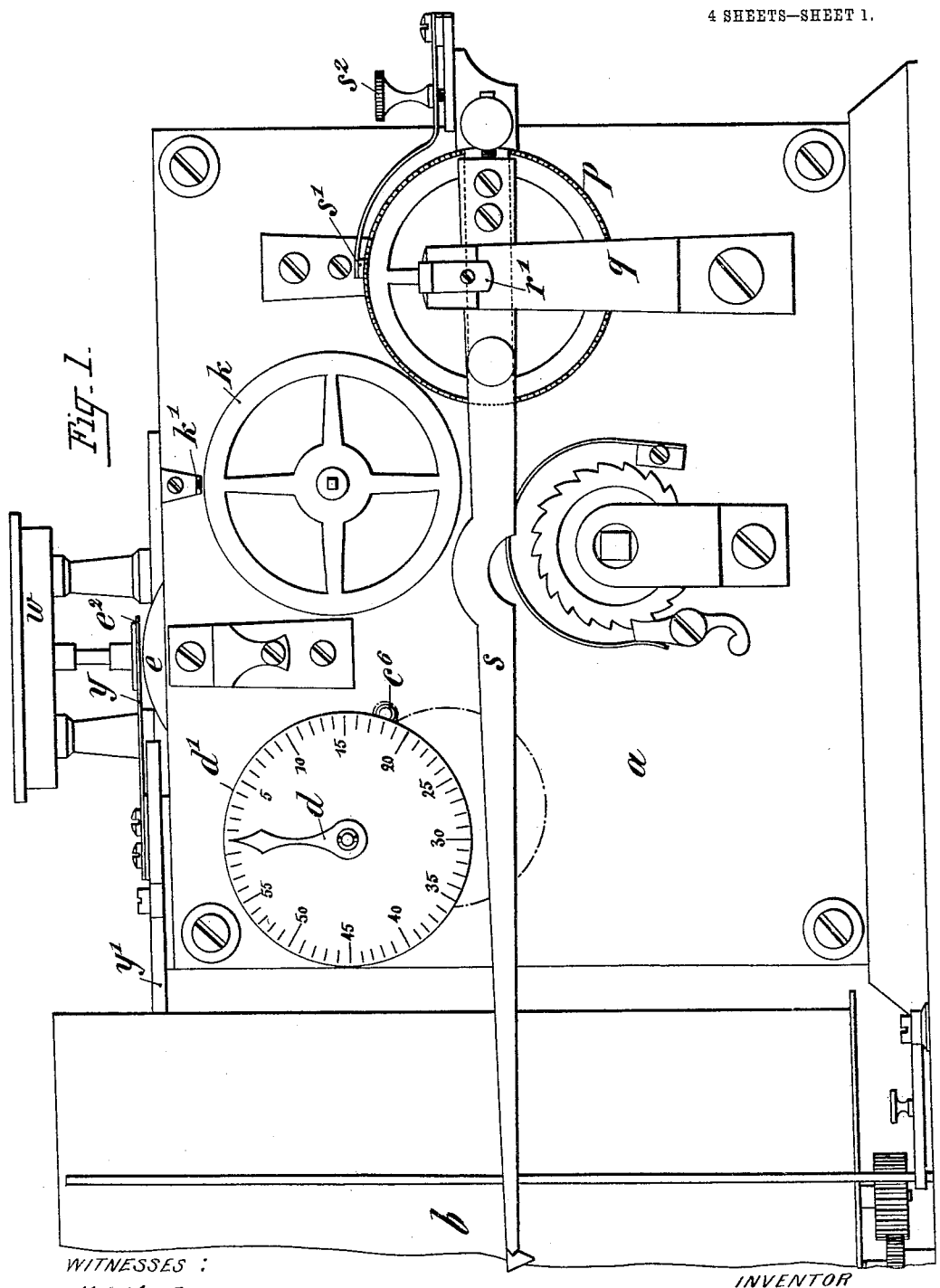

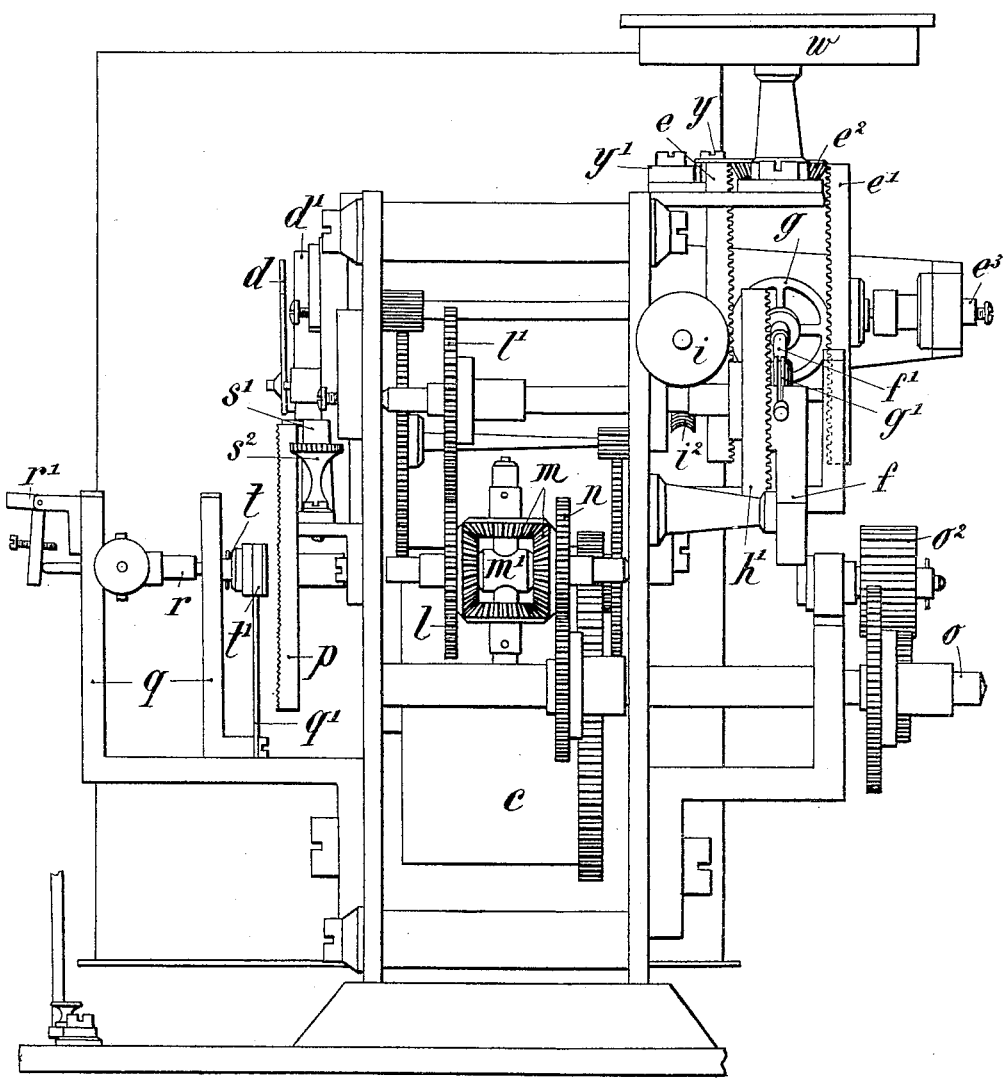

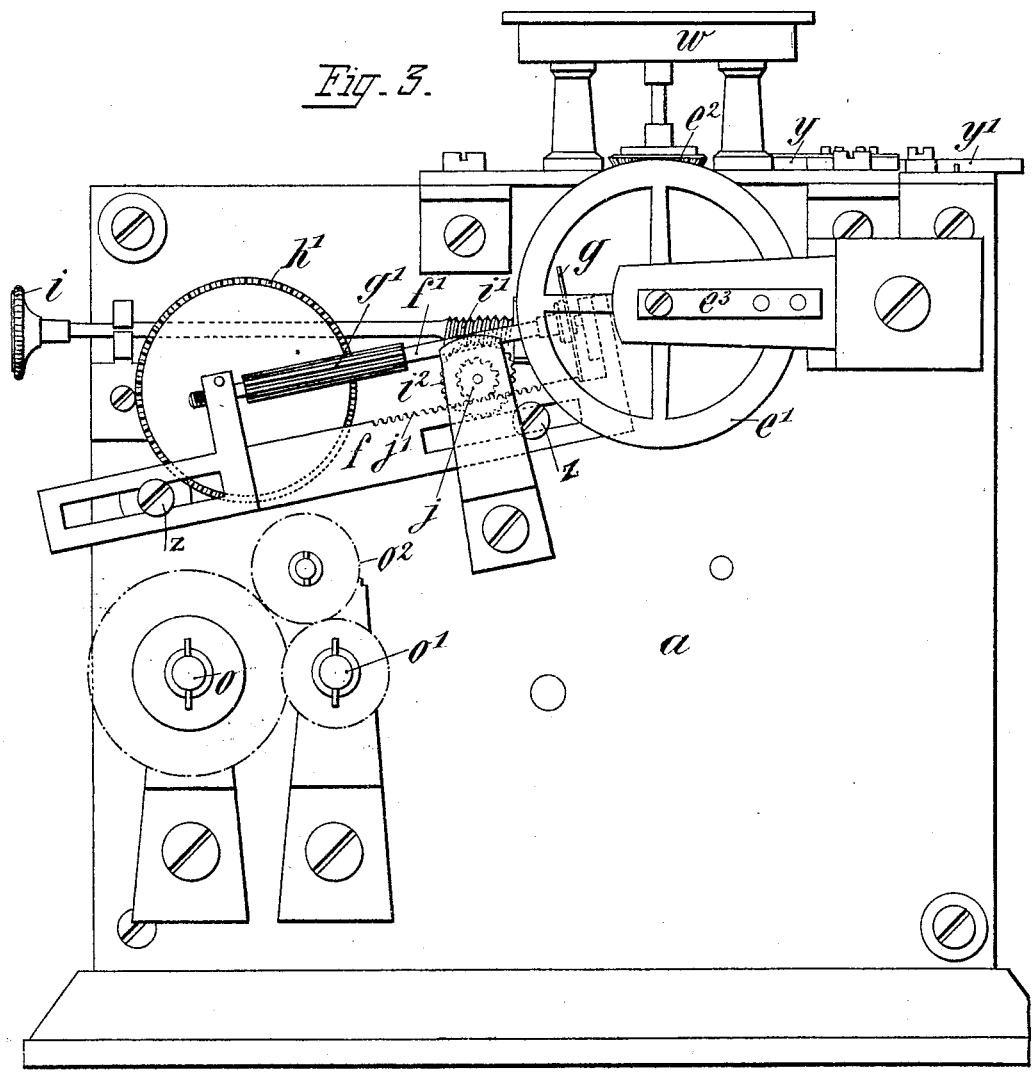

UNITED STATES PATENT OFFICE.

JULES RICHARD, OF PARIS, FRANCE.

REGISTERING DIFFERENTIAL-SPEED INDICATOR.

No. 823,440.    Specification of Letters Patent.    Patented June 12, 1906.

Application filed November 2, 1903. Serial No. 179,431.

*To all whom it may concern:*

Be it known that I, JULES RICHARD, manufacturer, of 25 Rue Mélingue, Paris, France, have invented an Improved Registering Differential-Speed Indicator, of which the following is a full, clear, and exact description.

This invention relates to an improved registering differential-speed indicator, and is useful in the study of alternating currents and for other purposes where it is desired to measure fluctuations of speed.

Considering a motor-shaft, if its angular speed is calculated for a sufficient number of revolutions a number $v$ is obtained, which is the mean speed of this shaft during the time of observation. If, on the contrary, examination is made of what happens during only a single revolution of the said shaft, it is noticeable that the speed of rotation is sometimes appreciably greater or less than the speed $v$ previously calculated and successively takes one of two values $v'$ $v^2$, one a maximum and the other a minimum value, respectively, above and below the mean speed $v$. This irregularity in the speed of rotation of the shaft is due to the dead-points of the piston and to sudden variations of the load. The "coefficient of irregularity" of the shaft is expressed by the ratio $$\frac{v' - v^2}{2\,v}$$

that is, the ratio between half the variation of the speed $$\frac{v' - v^2}{2}$$

and the mean speed $v$. This coefficient of irregularity gives some information; but it has not the absolute value desirable for an electrician. That which is important to the electrician is the maximum angular movement $\Theta$ of the actual shaft relatively to an ideal shaft rotating uniformly. In consequence, electricians have determined the greatest value that in practice the angle $\Theta$ can be allowed to assume in their installations require an apparatus capable of showing an angular variation at least equal to one two-hundred-and-fiftieth of a revolution of a shaft or other rotary part of a machine making one hundred and twenty-five revolutions per minute. In order to determine the coefficient of error in one revolution of the shaft, it is indispensable to provide some instrument controlled by a movement driven at a uniform speed, which instrument shall in turn actuate a needle displaceable over a dial divided into seconds and fraction of seconds and the speed of which can be controlled by a chronometer. There is thus provided an ideal crank par excellence, since with a good chronometer the precision of the apparatus can always be controlled. It will be hereinafter shown how the speed of the ideal shaft is obtained in order to compare it with the actual working shaft at all speeds and to determine therefrom the variation by registering only the differences of speed or slip—that is to say, the angle expressed in degrees for ease of reading—and commencing with rest, whatever may be the actual speed of the shaft.

A clock-movement rendered uniform by an isochronous regulator communicates its movement to an arrangement comprising two friction-plates. A roller, the position of which relatively to the axis of the two plates can be adjusted, serves to transmit a more or less rapid motion to one of the wheels of a differential train, the other wheel of which is actuated by the shaft to be studied. By regulating the position of the friction-roller it is possible to arrange that the first wheel rotates at the same speed as the second wheel, the radial arm of the two planet-wheels of the train then remaining stationary. This position of the friction-roller, to which only one speed of the wheels corresponds, gives, read off on a graduated bar, the actual speed $v$ of the shaft. If then the shaft under consideration rotates constantly at the speed $v$, the radial arm of the differential train will remain at rest, and a bar provided with a pen or stylus rigid with this arm will trace a straight line on a rotating drum; but, as hereinabove stated, the speed of the shaft may undergo variation during a complete revolution. It results that when the speed falls below the mean speed the radial arm will be moved in one direction, and when the speed increases the radial arm will be moved in the other direction. The displacement of the differential train is recorded by a needle and amplified, so that a slip equal to a small fraction of a revolution can be observed.

This invention is described with reference to the acompanying drawings, in which—

Figure 1 is a front elevation of the apparatus. Fig. 2 shows a side view of the same, with the casing removed to expose the mechanism. Fig. 3 shows a rear view, and Fig. 4 is a plan of the said apparatus with the upper plate removed. Fig. 5 is a plan of the centrifugal regulator.

Like letters of reference indicate corresponding parts in the various figures of the drawings.

The apparatus comprises a clockwork-train, inclosed in a casing $a$, and a recording-drum $b$, rotated by a spring-motor. The case $a$ incloses a spring-barrel $c$, which through wheels $c'$ $c^2$ $c^3$ $c^4$ $c^5$ $c^6$ drives a hand $d$, marking seconds on a dial $d'$, and the two friction-plates $e$ $e'$, rotating in opposite directions, as a result of the intercalation of the pinion $e^2$. On the rear face of the case a carriage $f$ can slide on screws $z$, and on this carriage is mounted a spindle $f'$, carrying at one end a friction-roller $g$ and at its other end a long pinion $g'$, gearing with a crown-wheel $h'$. The friction-roller $g$ is actuated by the rotation of the plates $e$ $e'$, one of said plates—viz., $e'$—being kept in permanent contact with the said roller by a light spring $e^3$. By means of a button $i$, controlling an endless screw $i'$, gearing with the pinion $i^2$, mounted on the spindle of a second pinion $j$, gearing with the rack $j'$ of the carriage $f$, the roller $g$ can be moved toward or away from the center of the wheels $e$ $e'$, so as to give the said roller a more or less rapid rotation on itself proportional to the radius of the point of contact of the roller with the plates and always a function of the time. The speed of rotation corresponding to a given position of the roller is, moreover, given at each instant by a graduated scale $k$, mounted on the spindle of the wheels $i'$ $j$ and moving in front of the fixed index $k'$.

The movement of the roller $g$ is communicated by the crown-wheel $h'$ through an intercalated wheel $l'$ to a toothed wheel $l$, which is included in a differential train $m$. This train comprising two bevel-wheels, mounted loose upon their spindle $m'$, engages on one side with a conical projection extending from the wheel $l$ and on the other side with a second projection carried by a wheel $n$.

The wheel $n$ is driven from the shaft whose motion it is desired to observe by means of any suitable clutch device mounted either on the spindle $o$ or on the spindle $o'$. An arrangement of reducing-gear $o^2$ is employed to reduce the speed of rotation or to reverse the direction thereof, since the direction of motion of the shaft is important. The wheels $l$ and $n$ are mounted loose upon the spindle $m'$ of the differential train $m$, and this spindle carries a fine-toothed clutch crown-wheel $p$, which consequently will partake of the movement of the train $m$.

Between two bearing-plates $g$ is arranged, so as to slide, a spindle $r$, carrying a bar $s$ and a cross-bar $t$, provided with two pads $t'$. These pads are normally held away from the wheel $p$ by a spring $g'$, but can be brought into contact with the teeth of the wheel by pressing on a small bent lever $r'$. A spring-brake $s'$, actuated by pressing the regulating-button $s^2$, can be pressed against the wheel $p$ to damp the vibrations of the recording-bar.

The vertical spindle of the pinion $e^2$ is provided with a centrifugal governor, Fig. 5, for the purpose of keeping the speed of rotation of the plates $e$ $e'$ constant and uniform. This governor comprises two brake-shoes $u$, carried on pivots $u'$, mounted on the movable plate $u^2$. These shoes, drawn back by springs $v$, are thrown outwardly by the effect of centrifugal force, and then press against the interior surface of a fixed cylindrical dust-proof box $w$, thus effecting the automatic braking of the clockwork-movement, so as to render the motion of the latter isochronous. The force of the opposing springs is also adjustable by the operation of screws $x$ acting on the levers $x'$, to which the ends of the springs $v$ are fixed. A spring-brake $y$ permits the clockwork-movement to be started or stopped accordingly as said brake is applied to the wheel $e$ or kept raised by the lever $y'$ on the outside of the case.

Supposing the apparatus to be adjusted—that is to say, that by previous adjustment of the small screws $x$ the hand or pointer $d$ is caused to move synchronously with the seconds-hand of a chronometer—after starting the movement and engine then by operating the button $i$ the roller $g$ is adjusted to such a position that the train $m$ ceases to move, which can be ascertained by throwing the wheel $p$ into gear with the pads $t'$, carrying the bar $s$. Then when equilibrium is attained any desired apparatus can be coupled to the engine and the different phases of movement which result therefrom can be studied. The variations of speed or slip are reproduced by a movement in one or the other direction of the radial arm of the differential train. For example, forward slip may cause the radial arm to move so that the bar $s$ rises, and rearward slip may cause the said arm to move so that the bar $s$ falls.

I claim—

1. A device for recording the coefficient of irregularity of a shaft comprising in combination, a motor with isochronous movement, a differential gear interposed between said motor and said shaft, friction-rollers affording means for driving said gear from said motor, means for adjusting said rollers to control the speed of said gear, and means for indicating the speed of said gear.

2. In combination, a pair of parallel wheels, means for imparting a uniform rotation thereto in opposite directions, a friction-disk running between said wheels and driven thereby, means for adjusting said friction-disk substantially radially with respect to said wheels, a differential gear-train, means for imparting the aforesaid uniform rotation to one side of said gear-train, means for imparting a rotation to be measured to the other side of said gear-train, recording means controlled through said gear-train, and a scale coöperating with said adjusting means.

3. In combination, a pair of oppositely-disposed wheels, means for imparting a substantially uniform rotation to the same in opposite directions, a friction-disk between the said wheels, a spindle carrying the same and disposed substantially radially with respect to said wheels, means for adjusting the same longitudinally, an elongated pinion on the said spindle, a crown-wheel meshing therewith, a differential gear-train, one side whereof receives motion from said crown-wheel, means for imparting a rotation to be measured to the other side of said gear-train and means for indicating the displacement of said gear-train due to differences in the rotations transmitted thereto.

4. In combination, a motor with an isochronous movement, a series of wheels operated by the motor and controlling a handle indicating the seconds, a pair of friction-plates arranged opposite one another, one of the plates being carried along by the motor having an isochronous movement, a pinion interposed between the plates and transmitting to the second plate a rotary motion in a reverse direction to that of the first one, a centrifugal regulator mounted upon the axis of the pinion, a friction-roller arranged between the two friction disks or plates, a spindle-rod carrying the roller and arranged substantially radially with reference to the plates, an elongated pinion mounted on the spindle, a carrier upon which the spindle is mounted, an operating device for imparting to the latter a longitudinal displacement, a scale indicating the speed of the rotary motion transmitted to the spindle, a toothed crown-wheel meshing with the elongated pinion, a differential train of gearing receiving on one side the movement of the toothed crown-wheel, means connecting the other side of the differential train of gearing to the shaft, the rotation of which is to be measured, a wheel milled on one side keyed to the shaft of the differential gear, and a handle adapted to be carried along in the motion imparted to the wheel keyed upon the shaft of the differential gear when the latter receives an angular displacement due to differences in the rotations imparted thereto.

The foregoing specification of my improved registering differential-speed indicator signed by me this 1st day of October, 1903.

JULES RICHARD.

Witnesses:
PAUL T. PAQUET,
MAURICE H. PIGNET.